Sept. 2, 1969   L. D. RILEY   3,464,229
CABLE OPERATED CONVEYOR AND FREEZING BOX STRUCTURE
Filed Dec. 1, 1967   4 Sheets-Sheet 1
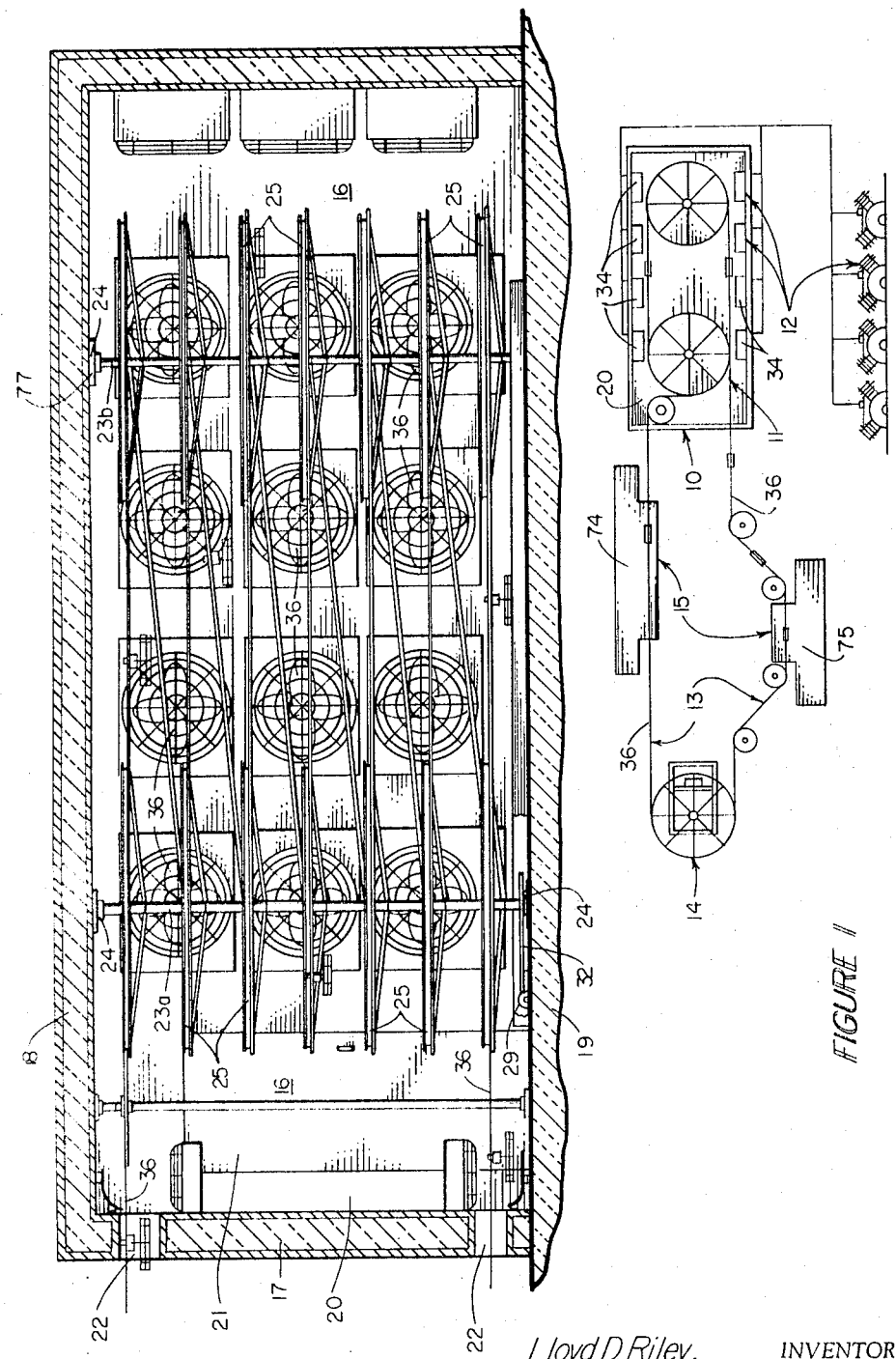
Lloyd D. Riley, INVENTOR.
ATTORNEY

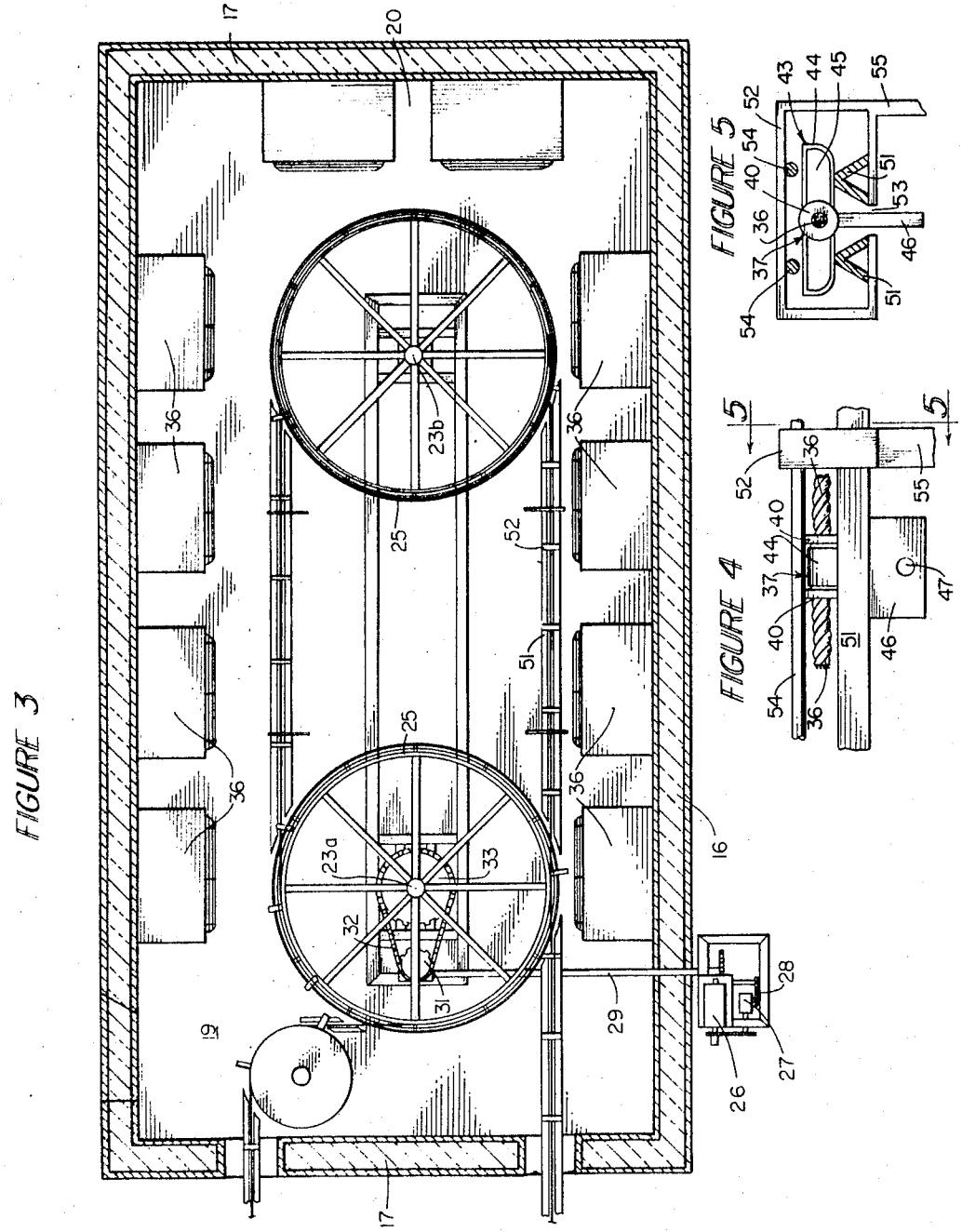

Sept. 2, 1969  L. D. RILEY  3,464,229
CABLE OPERATED CONVEYOR AND FREEZING BOX STRUCTURE
Filed Dec. 1, 1967  4 Sheets-Sheet 3
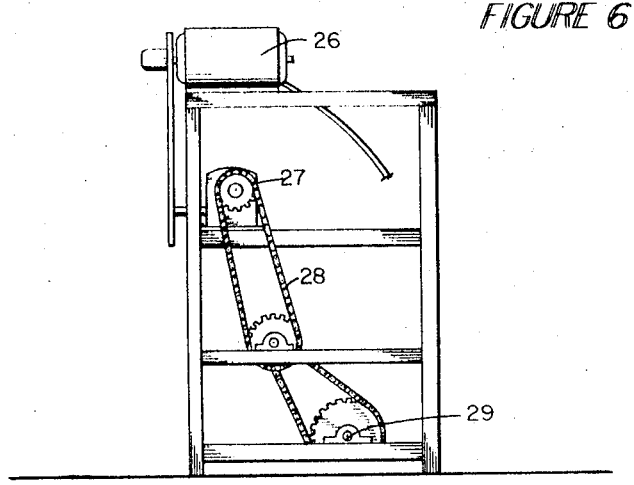
FIGURE 6
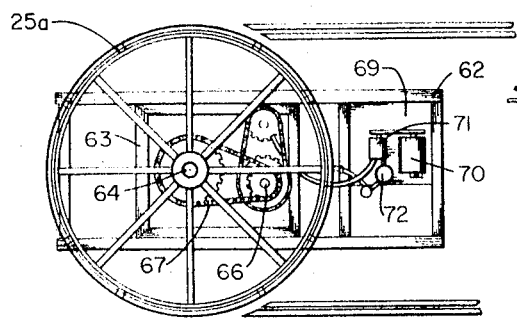
FIGURE 7
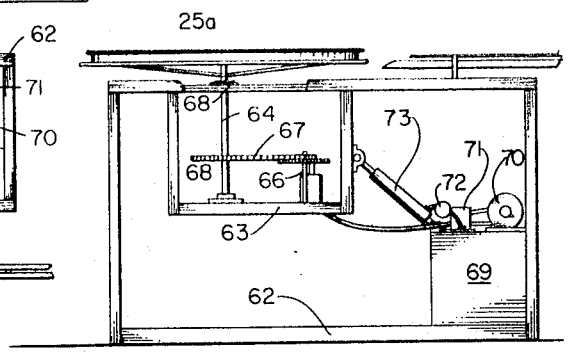
FIGURE 8
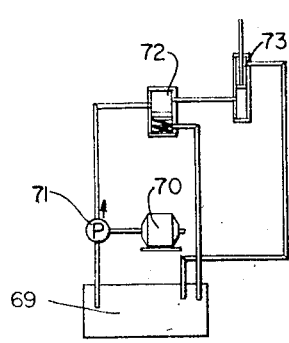
FIGURE 9
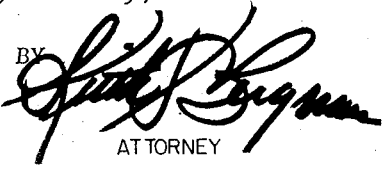
Lloyd D. Riley, INVENTOR.
BY
ATTORNEY Sept. 2, 1969  L. D. RILEY  3,464,229
CABLE OPERATED CONVEYOR AND FREEZING BOX STRUCTURE
Filed Dec. 1, 1967  4 Sheets-Sheet 4
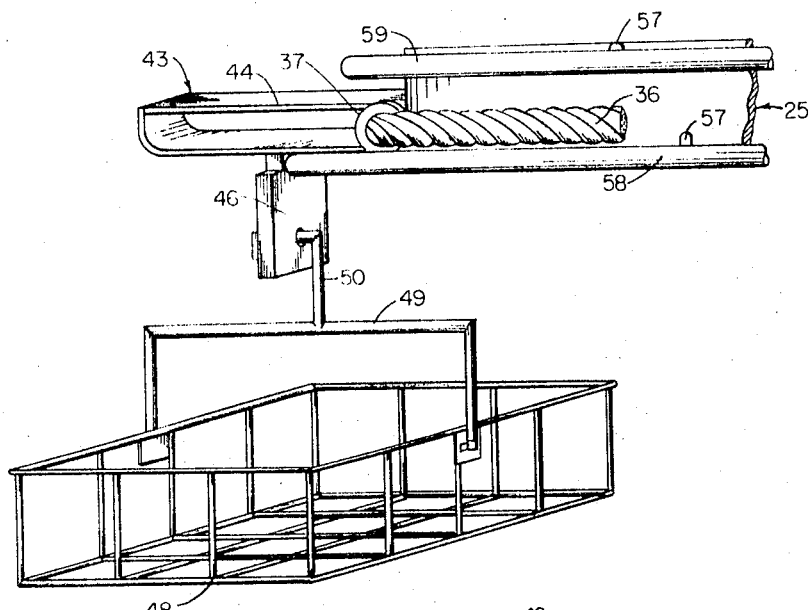
FIGURE 10
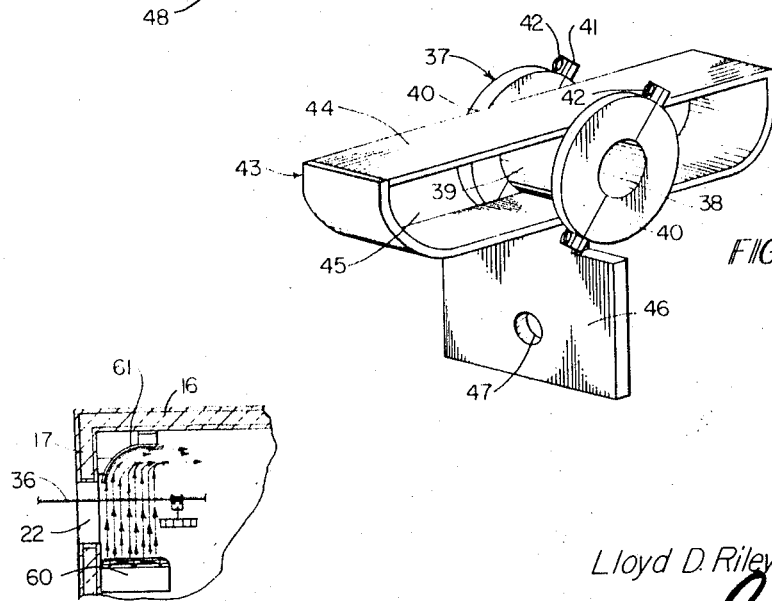
FIGURE 11
FIGURE 12
Lloyd D. Riley, INVENTOR.
BY
ATTORNEY

United States Patent Office 3,464,229
Patented Sept. 2, 1969

3,464,229
CABLE OPERATED CONVEYOR AND FREEZING BOX STRUCTURE
Lloyd D. Riley, 1618 W. 8th Place,
Kennewick, Wash. 99336
Filed Dec. 1, 1967, Ser. No. 687,280
Int. Cl. F25d 25/04; F65g 17/12
U.S. Cl. 62—381          3 Claims

ABSTRACT OF THE DISCLOSURE

An airblast freezer providing product transit in plural courses through a freezing chamber by means of an endless cable carrying plural product containers. The cable course extends without the freezing enclosure for product imput, processing and removal. Adjustable tensioning means provide appropriate cable tension under varying physical environs. Product containers are releasable mounted to provide interchangeability.

BACKGROUND OF INVENTION

A. Related applications

There are no applications related hereto filed in this or any foreign country.

B. Field of invention

This invention relates generally to freezing chambers, and more particularly to a freezing chamber having a cable operated conveyor transiting without the freezing chamber for product imput, processing and removal, and over plural courses therein for product freezing.

C. Description of prior art

In the freezing industry generally and especially in the mechanical refrigeration branch thereof, it is generally necessary to maintain a product to be frozen within a freezing area for a considerable period of time for the product to become entirely frozen. It also is oftentimes desirable that freezing processes be of a continuous nature to increase facility capacity and provide for simple operation. Quite commonly in such processes, to avoid unnecessarily slow speeds and large size of freezing chambers, it has become known to provide a conveyor or element with lengthy course of product travel within a relatively small freezing area; freezing devices embodying this principal have heretofore become well known.

Many such units provide a course of product transit outside a freezing chamber to provide for product imput and removal from the conveying structure, and oftentimes to provide for product processing along the conveyor course. This function requires either a non-continuous product moving means with transfers between different elements, a structure that is economically costly and mechanically delicate, or the existence of a continuous product moving means traversing a course through radically differing physical environs, especially in regard temperature.

It is with the latter type of devices that the instant invention is concerned. Various freezing units having continuous product moving means have heretofore become known, but they in general have embodied some type of rigid moveable mechanical linkage joining rigid elements of the product conveyor and because of the radical difference in temperature within and without a freezing chamber and the necessary mechanical limitations, such devices have required complex and costly compensating systems to deal with the dimensional changes in the various elements caused by the temperature variance.

The instant invention is distinguishable from the prior art in that it provides a particular endless cable activated product conveying system that allows for simple mechanical adjustment to compensate for temperature related variance in the dimension of components. The invention further provides a novel means of supporting the cable during its course of transit and allows extensive portions of the cable to transit outside the freezing unit to provide not only means of product imput and removal, but also of product processing directly along the conveyor line. The invention also allows a simple, releasable mounting of individual product carriers on the cable to provide interchangeability of carriers.

Summary of invention

The instant invention was conceived to provide a freezing structure with an endless cable product conveyor, having a plurality of releasable product containers, transiting plural courses within a freezing chamber for the freezing operation and a potentially lengthy course externally thereof for product placement, removal and processing, if desired.

This function is accomplished in a freezing chamber, preferably rectilinear, providing thermal insulation from the surrounding environs. Vertically disposed shafts are positioned in the opposed medial end parts of the freezing chamber, at least one driving shaft being journaled for rotation. Plural wheels, each having cable supporting means about the periphery, are stacked on each of the shafts in a generally rotatable fashion with at least one and preferably more of the wheels on the rotatably journaled driving shaft irrotatably communicating with that shaft. A motor drives the rotatably journaled shaft through appropriate mechanical linkage and thusly the cable support wheels irrotatably carried thereby to provide a driving means for the cable. Cable passes in a single spiral course from one such support wheel to the next lower opposed wheel carried by the other shaft to provide a lengthy course within the freezing chamber.

The cable associated product carriers pass through appropriate orifices preferably provided with air locks in the freezer walls to transit externally thereof. A course for the cable is provided externally of the freezing chamber with area for product imput, processing and removal, if desired. The cable passes in this course externally of the freezing chamber, about a moveable tensioning sheave adapted to move the cable away from its normal course of travel to increase this course and thereby cause tension and take up slack therein. This tensioning device is controlled by a tension sensor to provide automatic tensioning in the cable and is provided with plural depending product carriers positioned in a removable fashion to provide interchangeability.

Mechanical refrigeration units are provided about the periphery of the freezing chamber with fans directing flow of gases in the chamber over the coils and against the product with some force. Preferably such heat transfer means are provided about substantially all of the interior periphery of the freezing box.

In providing such a structure it is:

A principal object of my invention to provide a freezing box with a cable activated product carrier traversing plural courses within the freezing box and a course external thereof of sufficient length to allow operations upon the carried product.

A further object to provide such a structure that has a simple compensating and tensioning device to automatically maintain proper tension in the cable during operation of the system.

A further object to provide such a cable conveyor that has plural, releasably attached product carriers that may be simply removed to allow replacement and change.

A still further object of my invention to provide such a device that has adequate cable course exterior of the freezing chamber to allow not only product placement and removal but also processing of product along the cable course.

A further object of my invention to provide such a structure that is of new and novel design, of sturdy and durable nature, of simple and economic manufacture and one that is otherwise well adapted to the uses and purposes for which it is intended.

Other and further objects of my invention will appear from the following specification and drawings which form a part of this application.

In carrying out the objects of my invention, however, it is to be understood that its essential features are susceptible of change in design and structural arrangement with only one preferred practical embodiment being illustrated in the accompanying drawings, as required.

Brief description of drawings

In the accompanying drawings wherein like numbers of reference refer to similar parts throughout:

FIGURE 1 is a semi-diagrammatic representation of my cable conveyor freezing system showing its elements and their relationship.

FIGURE 2 is a vertical cross-sectional view through the freezer box showing the cable supports and course of cable transit.

FIGURE 3 is a horizontal cross-sectional view of the freezer box illustrated in FIGURE 2, showing the elements, their configuration and relationship from this aspect.

FIGURE 4 is a vertical orthographic view of a portion of cable, a cable support and product holder attachment.

FIGURE 5 is an orthographic cross-sectional view of the structure of FIGURE 4 taken on the line 5—5 thereon, in the direction indicated by the arrows.

FIGURE 6 is an orthographic side view of the motor and driving mechanism of my invention.

FIGURE 7 is a top orthographic view of the cable tensioning device.

FIGURE 8 is a vertical orthographic view of the same tensioning device as illustrated in FIGURE 7.

FIGURE 9 is a semi-diagrammatic view of the hydraulic system operating the cable tensioning device.

FIGURE 10 is an isometric view of an individual product carrier showing its joinder to the cable conveyor.

FIGURE 11 is an enlarged isometric view of the communication between cable fastener and product carrier fastener.

FIGURE 12 is a cross-sectional view of air curtain device associated with the cable imput and exit orifices.

Description of preferred embodiment

Referring now to the drawings in more detail and particularly to those of FIGURES 1, 2 and 3, it will there be seen that my invention generally comprises freezing box 10, having cable support system 11 and mechanical refrigeration means 12 associated therewith; an endless cable product carrying means 13 transiting within box 10 and externally thereof; cable tensioning means 14 external of the freezing box and product processing stations 15 along the course of the product cable. The mechanism is preferably carried within a structural enclosure, such as a warehouse (not shown).

Freezing box 10 is a rectangular enclosure formed by elongate sides 16, ends 17, top 18 and bottom 19, all structurally communicating to define rectilinear freezing chamber 20. Preferably all of these peripheral surfaces are of a thermally insulating nature to lessen the passage of heat therethrough and aid in maintaining a freezing temperature within chamber 20. The insulating nature of this structure is not per se a part of my invention and any of the thermal insulations of commerce will serve the purpose, though I have found a foamed styrene plastic expanded between opposed parallel structural surfaces to be quite satisfactory. The peripheral surfaces of the chamber should have sufficient structural rigidity to allow support of the various elements of the invention carried therein. This generally requires construction of the nature commonly found in the light frame arts.

Door 21 is provided in one of the sides 16 to allow worker access to the chamber. Product orifices 22 are provided in one end member 17 to allow ingress and egress of the cable and its product carriers.

The cable support system 11 within freezer box 10 includes vertically disposed paired opposed cable wheel shafts 23 mounted between freezer box top and bottom 18, 19 by appropriate journals 24; each shaft carries a plurality of stacked, vertically spaced cable supporting wheels 25, there being one more wheel on the driving shaft than the slave shaft 23b. Each of the wheels 25 on the shaft 23 is rotatably mounted to allow a differential motion between the various wheels and the shaft. At least one and preferably more of the cable supporting wheels on driving shaft 23a are irrotatably mounted relative the shaft so as to be driven by rotation of the shaft. The number of wheels irrotatably mounted will vary with the spacing of product carriers on the cable and the weight of product carried thereby; preferably no more than necessary will be so mounted as since the cable is frictionally driven the more driving wheels that drive the cable the greater is the tendency to bind about the wheels.

Driving shaft 23a is driven by a prime mover 26, preferably external to the freezing chamber for more favorable operative environment. This mover communicates with speed reduction device 27 and through appropriate mechanical linkage 28 to communicate rotary motion to jack shaft 29. This shaft 29 communicates through an appropriate hole interiorly of the freezing box. Bevel gearing unit 30 transmits the torque to driving pinion 31 journaled for motion about a vertical axis. Roller chain 32 communicates from driving pinion 31 to driven pinion 33 irrotatably carried by the lower portion of driving shaft 23a to complete the power train from the prime mover to the cable shaft.

A blast-type mechanical refrigeration is provided within freezing box 10 by means of plural coil-fan units 36 positioned about the inner periphery of the freezing chamber to direct a substantial blast of cold air against the product during its transit through the box. Such freezing units are well known in the art and constitute no direct part of my invention. The units should be in sufficient number and appropriately placed immediately next to the course of product travel to direct a substantial blast of air upon the product to disturb any insulating air envelopes associated therewith. It is possible to make a more compact freezing box by placing the coil for units between cable wheel shafts 23 and within the course of the product cable, with air blast directed outwardly, but such an arrangement generally allows for a lesser number of units that may not be sufficient to provide the heat transfer required of a particular structure.

Coil-fan units 34 are supplied with compressed gas by externally located compressors 35 and provided with appropriate valving and thermal control means, as well known in the refrigeration arts, to provide controlled refrigeration in the coils.

The cable support system of my invention is adapted to function with particular product carries and linkages shown especially in the drawings of FIGURES 10 and 11. Cable 36, providing the means of moving product through freezing chamber 10, is an endless elongate member transiting the general course illustrated in FIGURE 1. The cable is provided with plural product carriers along its length, preferably with the average product these carriers are spaced at a distance of about each foot. Cable connector 37 is a spool-like element having central bore 38, smaller body portion 39 and opposed larger end rims 40. Preferably the structure is split into two releasably joined halves so that it might be adjustably positioned by frictional engagement upon cable 36 without the necessity of placement over the end of the cable structure. This function is accomplished by joiner of opposed cooperating ears 41 by bolts 42 threadedly engaged therebetween.

Carrier connector 43 has horizontal body 44 defining elongate channel 45 therein adapted to slidably receive cable connector 37 with the connector body 44 extending perpendicularly to the cable axis. Basket yoke arm 46 depends from the medial lower portion of body 44 and in its lower position is provided with basket yoke hole 47 to allow releasable suspension of a product basket therefrom.

A simple product carrier is shown in the illustration of FIGURE 10 where it is seen to include wire basket 48 pivotably communicating with yoke 49 carrying upwardly extending yoke arm 50 in its medial portion to pivotably communicate with basket yoke arm 46. Many of the various product carriers heretofore known in the art might be successfully used with my invention if they might be suspended from the basket yoke arm 46 and otherwise are physically moveable along the product course. The particular product carrier illustrated, however, is well adapted to both product processing and freezing.

The method of supporting cable along linear courses is shown bestly in the illustrations of FIGURES 4 and 5, where it is seen that spaced, parallel angle irons 51 are provided, with apexes pointing upwardly, along the linear course of the product travel. These angle irons are maintained in position by plural spaced holding brackets 52 of a rectangular shape defining an internal area of appropriate size and shape to allow passage of carrier connectors 43 and having channel 53 in the medial portion of the lower element to allow passage of basket yoke arm 46 therethrough. The various cable connectors are then slidably supported in their lower portion upon the upwardly projecting apexes of angle irons 51 and are maintained in lateral alignment thereon by means of basket yoke arm 46 extending downwardly therebetween. Plural spaced tipping rods 54 are provided substantially above the apexes of the angle irons or slightly laterally outwardly therefrom, but nevertheless within the lateral extension of the upper portion of carrier connectors 43, to prevent the tipping of the carriers from support upon the angle irons. The various holding brackets 52 are positioned by support elements 55 communicating by mesne mechanical linkage with a rigid support along the course of the product carrier.

The support of carrier connectors 43 on cable wheels 25 is shown bestly in the illustration of FIGURE 10. Here it is seen that the periphery 56 of each of the cable wheels is provided with radially outwardly extending supports 57 maintaining support ring 58 at a spaced distance radially outward from rim 56. A second tipping support ring 59 is provided at a spaced distance upwardly from ring 58 with sufficient space therebetween to allow sliding passage of carrier connector 43. With this structure then, when there be some tension on cable 36, the cable connector 37 will be free to slide within channel 45 of carrier connector 43 and will tend to a radially inward position when the cable pass about one of the cable wheels 25 such as that illustrated in FIGURE 10. In this position the downwardly depending basket yoke arm 46 will pass about the periphery of rim 58 and the entire cable may then pass about the periphery of cable supporting wheel 25. If cable 36 have sufficient tension, the frictional engagement of the cable with the supporting wheels will be sufficient to allow the wheels to drive the cable in a lineal course. The number of driving wheels must be individually determined in each particular situation to provide appropriate driving forces.

Preferably some means will be provided to lessen the transfer of gases in and out of freezing box 10 through the product orifices 22; this may be a necessity if some type of inert gas freezing be used. I have found an air curtain to be quite satisfactory for this purpose though undoubtedly other air lock devices known in the art might function satisfactorily. Such an air curtain might be created as shown in FIGURE 12 by fan 60 creating a substantial blast of air across orifice 22 substantially parallel to the member carrying the orifice, especially as aided by an appropriate baffel 61, all as well known in the air curtain art.

Cable tensioning system 14 of my device is shown bestly in the illustrations of FIGURES 7 and 8. Preferably this structure is located externally of freezing box 10 to provide a less physically rigorous environment for its mechanical activities. A rectilinear frame 62, positioned upon some structurally rigid support carries wheel carriage 63 for sliding motion parallel to the longer dimension of frame 62. The wheel carriage may be supported in frame 62 by the simple tenon structure illustrated, or if desired, by more sophisticated mechanical linkages for such purposes. Wheel carriage 63 rotatably mounts tension wheel shaft 64 in bearings 68 for rotation about a substantially vertical axis. Cable support wheel 25a of a construction similar to that of support wheels 25, is irrotatably carried by the upper extension of shaft 64 in a position for slidable motion relative frame 62. If the course of cable transit exterior of freezing box 10 be very long, preferably but not necessarily, the support wheel 65 is driven by prime mover 66 communicating by appropriate mechanical linkage 67 with shaft 64. Obviously if this linkage be used, the motion of motor 66 will have to be reasonably synchronized with the motion of the product carrying cable within freezing box 10 to provide a mechanically compatable motion of the cable throughout its length.

An hydraulic system is carried by the lower portion of frame 62, including reservoir 69 structurally mounting prime mover 70 communicating with pump 71 and through pressure regulator 72 to hydraulic cylinder 73. Hydraulic cylinder 73 extends to pivotably communicate between frame 62 (or more properly the frame of reservoir 69 carried thereby) and wheel carriage 63 to provide lineal motion of the carriage relative the frame. Preferably pressure regulator 72 is of the by-pass type to prevent excessive mechanical deterioration in the system; obviously this regulation may be accomplished by other known means that maintain a constant pressure upon the cylinder thus creating a reasonably constant predetermined tension in cable 36.

Preferably the cable course external of freezing box 10 is similar to that illustrated in FIGURE 1 with the tensioning device located at a distance from the freezing box for the more desirable physical environ and for simple tensioning motions. This positioning also allows sufficient room along the course of cable transit, between the tensioning system and the freezing box, for product processing and imput station 74 and product removal and packaging stations 75. Mechanisms for each of these functions have come to be separate arts, but it is to be particularly noted that by reason of the method of product carriage my cable system may be well adapted to function to move product through various of the imput, processing, removal and packaging operations without the necessity of manual manipulation or removal of product to some secondary product moving means.

Preferably journals 24 of slave cable wheel shaft 23b are mounted upon adjustably positionable carriages 76 slidably carried by frames 77 mounted upon the interior surface of the freezing chamber. This structure allows for more substantial adjustment in cable length than may be accomplished by reasonable motion of the tensioning system, because the length of cable taken up by a linear motion of shaft 23b will be multiplied by the number of turns of cable about the shaft. Since there oftentimes is a stretching of cables during their use, such a gross type adjustment is quite desirable. It is more complex to move driving shaft 23a since this would require some type of lost motion linkage in the driving mechanism; generally motion of the shaft 23b will be quite sufficient to take up any required tension, however, and if not, the cable might be appropriately shortened.

With a freezing box of inside dimension of approximately eighteen by thirty feet dimensionally configured substantially as illustrated, I use approximately seven hundred (700) feet of cable, about five hundred twenty-five (525) feet of which are within the freezing chamber; the remaining cable allows a sufficient course outside the freezing chamber for appropriate product processing. I prefer to place a product carrier at spaced distance of about one foot on the cable. In freezing vegetables and particularly asparagus in one pound packages to a finished temperature of thirty degrees below zero Fahrenheit in such a unit, I find that the cable support wheel should rotate about one-third of a revolution per minute to produce a cable speed of about ten feet per minute through the box, giving a total transit time of approximately fifty-five minutes. Obviously however, this is only one particular example and times of transit and associated mechanical conditions will have to be regulated to certain individual products, individual freezing conditions and to desired results.

From the foregoing description it is to be particularly noted the product is moved entirely by semi-flexible cable in its course within and without the freezing box and that all mechanically rigid structures associated with the product travel are maintained in a reasonably constant physical environment either within or without the freezing box, but not transiting between such environments, as is the case with rigid conveying structures.

It is further to be noted from the structure described that change in the physical environment of the cable will cause change in its length and that this change is readily compensated by the tensioning means provided. It is further to be noted that there is no rigid mechanical linkage between the driving means and the product carrying cable so relative motion may occur without excessive resultant mechanical incompatability.

The foregoing description of my invention is necessarily of a detailed nature so that a specific embodiment of it might be set forth as required, but it is to be understood that various modifications of detail, rearrangement and multiplication of parts may be resorted to without departing from its spirit, essence or scope.

Having thusly described my invention, what I desire to protect by Letters Patent, and what I claim is:

1. A freezing apparatus of the nature aforesaid providing product transit, through a freezing chamber and for a substantial distance outside thereof, by a cable activated product carrier including, in combination:

a freezing chamber, defined by rigid insulated peripheral surfaces, having means of ingress and egress; refrigeration means with the freezing chamber; paired opposed cooperating wheel support shafts vertically journaled at spaced distances within the freezing chamber;

a plurality of cable supporting wheels carried for rotation at vertically spaced distances upon the wheel support shafts and at least one cable supporting wheel supported for rotation externally of the freezing chamber, each cable supporting wheel having a peripheral rim carrying a radially outward support ring to support a cable against gravity displacement;

an endless cable transiting a spiral course within the freezing chamber, from support wheels carried by one shaft to vertically adjacent support wheels on the other shaft, and externally thereof about the external cable support;

plural product containers releasably carried by the cable at spaced distances therealong;

automatic means of providing predetermined tension in the cable system; and means of driving the cable in a linear course along its supports.

2. The invention of claim 1 wherein each product carrier comprises a split spool-like cable connector having medial bore for releasable frictional communication about the cable and a smaller body with larger end rims slidably carried within the elongate channel of a carrier connector extending perpendicularly to the cable axis and having a downwardly depending yoke arm adapted to pivotably support a product carrying member.

3. The invention of claim 1 further including linear cable supporting means comprising a plurality of rectangular supporting brackets having the medial lower element removed and supported by an external support, each bracket carrying parallel, spaced angle irons with their apexes extending upwardly and spaced tipping rods thereabove, each vertically spaced to accept and support a product carrier connector therebetween and allow the depending yoke arm to project downwardly between the angle irons and pass through the bracket supports.

References Cited

UNITED STATES PATENTS

| 424,760 | 4/1890 | Cazin | 34—147 X |
| 1,068,565 | 7/1913 | Cerruti | 198—136 X |
| 1,523,971 | 1/1925 | Johnsen | 198—136 |
| 2,623,630 | 12/1952 | Erickson | 198—208 |
| 2,648,424 | 8/1953 | Bateman | 198—208 |
| 2,925,052 | 2/1960 | Glass | 62—345 X |
| 3,303,918 | 2/1967 | Larson | 198—136 X |

WILLIAM E. WAYNER, Primary Examiner

U.S. Cl. X.R.

34—147; 198—136, 208